July 26, 1960  R. G. YOUNG  2,946,356
TWISTER-HOOK
Filed Nov. 29, 1956
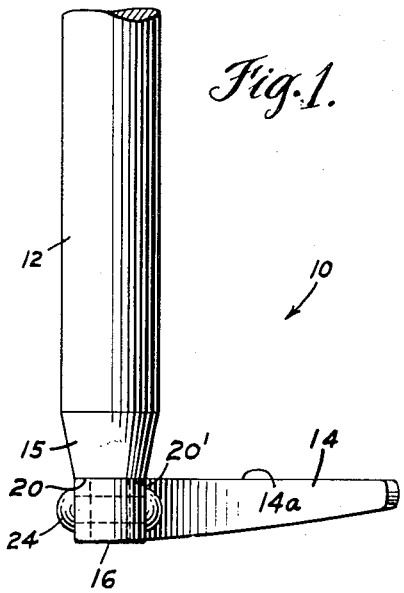
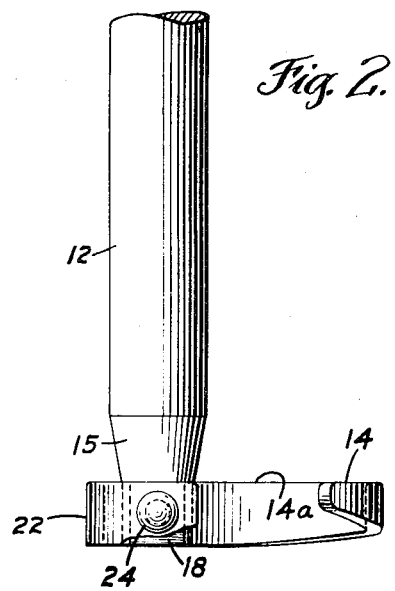
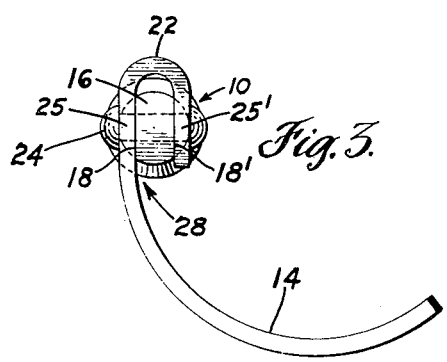
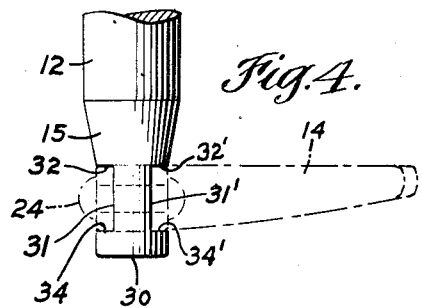
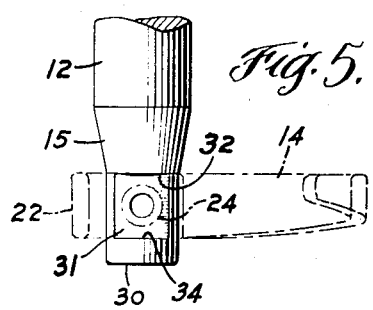
INVENTOR
ROBERT G. YOUNG
BY Joseph Allan Brown
ATTORNEY

United States Patent Office 2,946,356
Patented July 26, 1960

2,946,356

TWISTER-HOOK

Robert G. Young, New Holland, Pa., assignor to Sperry Rand Corporation, New Holland, Pa., a corporation of Delaware Filed Nov. 29, 1956, Ser. No. 625,173

2 Claims. (Cl. 140—119)

The present invention relates generally to agricultural machinery, and more particularly, to wire tie hay balers of the type shown in U.S. Patent No. 2,551,873, issued May 8, 1951, wherein a rotatable hook is employed to twist wires together.

Heretofore, twister-hooks for wire tie hay balers have been made by providing a shaft having a cast hook at one end, as shown for example in Fig. 7 of the above mentioned patent. Also, twister-hooks have been fabricated by providing a shaft having a hook of "Stellite" or the like fastened to it at one end. Both of these types of twister-hooks are expensive to manufacture; and, since the components are rigid, they may not be bent and adjusted to meet varying conditions.

One object of this invention is to provide a twister-hook of greatly simplified construction over twister-hooks of prior design, thereby enabling its manufacture at low cost.

Another object of this invention is to provide a twister-took having a shaft and a hook pivotally connected by a single member, the parts being so designed and disposed relative to each other as to prevent pivoting of the hook relative to the shaft about such connection.

Other objects of this invention will be apparent hereinafter from the specification and from the recital in the appended claims.

In the drawing:

Fig. 1 is a fragmentary, side elevation of a twister-hook constructed according to one embodiment of this invention;

Fig. 2 is a view looking from the left of Fig. 1;

Fig. 3 is a bottom view of the twister-hook;

Fig. 4 is a fragmentary, side elevation of a twister-hook having a shaft constructed according to another embodiment of this invention, the hook and the means for connecting it to the shaft being shown in dotted lines; and, Fig. 5 is a view looking from the left of Fig. 4.

Referring now to the drawing by numerals of reference and first to the embodiment shown in Figs. 1–3, 10 denotes generally a twister-hook which comprises two main parts, namely, rotatable shaft 12 and hook 14.

The body of shaft 12 is cylindrical for the major portion of its length. One of its ends, not shown, is connected to means for supporting and rotating it, such as the means shown and described in detail in Patent No. 2,551,873. The opposite end of the shaft has a conical portion 15, and a neck 16 to which hook 14 is connected. Neck 16 is semi-cylindrical, having a pair of diametrically opposed milled flats 18—18' (Fig. 3) which form a pair of shoulders or stops 20—20' on shaft 12.

Hook 14 is fabricated from fully annealed spring steel stock. It is arcuate in form when viewed in plan, having a U-shaped portion 22 at one end connected to neck 16 by a rivet 24. The legs 25—25' of portion 22 abut against the milled flats 18—18', respectively.

As shown in Fig. 1, hook 14 has a rectilinear edge 14a which extends perpendicular to the axis of shaft 12 and abuts against the respective stops 20 and 20', thereby preventing pivotal movement of hook 14 about rivet 24.

When viewed as shown in Fig. 3, hook 14 rotates countere-clockwise, the wires to be twisted together sliding into the acute angle pocket 28 formed by hook 14 and the neck 16 of shaft 12. Preferably, all sharp edges on the parts are rounded off to prevent cutting of wires during twisting operations, and the parts are hardened to reduce wearing by the wires.

The radius of hook 14 may be quickly and easily altered by applying pliers or the like to the free end of the hook and bending it. Thus, the hook may be disposed in optimum operating position.

In Figs. 4 and 5, there is shown a modified twister-hook construction in which the connecting rivet is relegated to merely locating and fastening the hook to the twister-shaft, being subjected to none of the forces tending to pivot hook 14 when the twister-hook is being used. Parts in Figs. 4 and 5 similar to parts in Figs. 1–3 have like numerals.

Shaft 12 has a neck 30 of greater length than neck 16, above described. Milled into neck 30 intermediate conical portion 15 and the outer end of the neck are diametrically opposed flats 31—31' which form axially spaced inner and outer stops 32—32' and 34—34', respectively. The milled areas provide spaces to snugly receive the legs of U-shaped portion 22 of hook 14, such U-shaped portion having parallel marginal edges which engage the respective shaft stops to prevent pivoting of the hook. It will be evident from Figs. 4–5 that rivet 24 merely serves to connect hook 14 to shaft 12.

Applicant, in the two embodiments of the invention, has provided structures which can be manufactured at much lower costs than similar hook structurtes of prior design. In each embodiment of the invention, a single connecting rivet is provided for fastening the twister-hook to the twister-shaft. Nevertheless, due to the relative disposition of the parts, pivotal movement of the hook is prevented.

While this invention has been described in connection with two embodiments thereof, it will be understood that it is capable of further modification, and this application is intended to cover any variations, usages, or adaptations of the invention following, in general, the principles of the invention and including such departures from the present disclosure as come within known or customary practice in the art to which the invention pertains and as fall within the scope of the invention or the limits of the appended claims.

Having thus described my invention, what I claim is:

1. In a wire tying mechanism, a twister hook comprising a shaft rotatable about its longitudinal axis, said shaft having a body of one diameter and a neck at one end of reduced diameter, said neck having a pair of diametrically opposed flats which form a pair of shoulders at diametrically opposite sides of said shaft where the neck adjoins the body, said shoulders extending perpendicular to said longitudinal axis, an arcuate hook extending transverse to said shaft axis and having a U-shaped portion at one end extending around said neck and engaging said shoulders, a single member extending transversely through said shaft and the respective legs of said U-shaped portion of said hook for pivotally connecting said hook to said shaft, and the legs of said hook each having a rectilinear edge remote from the outer end of said neck engaging its associated shoulder to thereby prevent pivotal movement of said hook about said connecting means.

2. In a wire tying mechanism as recited in claim 1 wherein each of said flats extend from said shaft body to a point spaced from the outer end of said neck whereby each flat forms two axially spaced shoulders, and said legs of said hook have a second rectilinear edge adjacent the outer end of said neck which engage the outer shoulders formed by said flats.

References Cited in the file of this patent

UNITED STATES PATENTS

| | | |
|---|---|---|
| 1,113,372 | Porter | Oct. 13, 1914 |
| 1,348,346 | Bates | Aug. 3, 1920 |
| 2,551,873 | Burfard | May 8, 1951 |
| 2,556,663 | Smalley | June 12, 1951 |
| 2,757,454 | Turcotte | Aug. 7, 1956 |